US011386429B2

(12) United States Patent
Fan et al.

(10) Patent No.: US 11,386,429 B2
(45) Date of Patent: Jul. 12, 2022

(54) CRYPTOCURRENCY SECURING METHOD AND DEVICE THEREOF

(71) Applicant: CYBAVO PTE. LTD., Citilink Warehouse Complex (SG)

(72) Inventors: Chi-Huang Fan, Taipei (TW); Ming-Chang Shih, Kaohsiung (TW)

(73) Assignee: CYBAVO PTE. LTD., Citilink Warehouse Complex (SG)

( * ) Notice: Subject to any disclaimer, the term of this patent is extended or adjusted under 35 U.S.C. 154(b) by 390 days.

(21) Appl. No.: 16/158,408

(22) Filed: Oct. 12, 2018

(65) Prior Publication Data

US 2020/0118095 A1    Apr. 16, 2020

(51) Int. Cl.
| G06Q 20/40 | (2012.01) |
| G06Q 20/38 | (2012.01) |
| H04L 9/08 | (2006.01) |
| G06Q 20/36 | (2012.01) |
| H04L 9/32 | (2006.01) |
| G06Q 20/06 | (2012.01) |

(52) U.S. Cl.
CPC ..... *G06Q 20/4014* (2013.01); *G06Q 20/3674* (2013.01); *G06Q 20/3823* (2013.01); *G06Q 20/3827* (2013.01); *H04L 9/0822* (2013.01); *H04L 9/0825* (2013.01); *H04L 9/0863* (2013.01); *H04L 9/3239* (2013.01); *G06Q 20/0658* (2013.01)

(58) Field of Classification Search
CPC ........... G06Q 20/4014; G06Q 20/3823; G06Q 20/3827; G06Q 20/3674; H04L 9/3239; H04L 9/0822; H04L 9/0863; H04L 9/0825
See application file for complete search history.

(56) References Cited

U.S. PATENT DOCUMENTS

| 7,039,809 | B1* | 5/2006 | Wankmueller | ....... | G06Q 20/401 |
| | | | | | 705/72 |
| 8,667,281 | B1* | 3/2014 | Chenna | .................. | H04L 9/0825 |
| | | | | | 713/168 |
| 9,432,186 | B2* | 8/2016 | Ni | .......................... | H04L 9/0869 |
| 10,594,486 | B1* | 3/2020 | Trachtman | ............ | H04L 9/0891 |
| 2007/0297610 | A1* | 12/2007 | Chen | ..................... | H04L 9/0822 |
| | | | | | 380/270 |
| 2012/0294445 | A1* | 11/2012 | Radutskiy | ............. | H04L 9/0863 |
| | | | | | 380/278 |

(Continued)

FOREIGN PATENT DOCUMENTS

| EP | 0821504 | A2 * | 1/1998 | .......... | H04L 9/0822 |
| EP | 1131911 | B1 * | 9/2007 | .......... | H04L 9/0822 |

(Continued)

*Primary Examiner* — Jacob C. Coppola
(74) *Attorney, Agent, or Firm* — WPAT, P.C.; Anthony King

(57) ABSTRACT

The present disclosure provides a cryptocurrency securing method and device thereof. The device receives an encrypted personal identification number from a user device, and decrypts the encrypted personal identification number via a first asymmetric key for deriving a personal identification number. The device decrypts an encrypted personal key via the personal identification number for deriving a personal key, and decrypts an encrypted cryptocurrency private key information via the personal key for deriving a cryptocurrency private key information.

13 Claims, 17 Drawing Sheets

(56) References Cited

U.S. PATENT DOCUMENTS

| | | | | |
|---|---|---|---|---|
| 2013/0007464 A1* | 1/2013 | Madden | ................ | H04L 63/061 |
| | | | | 713/179 |
| 2015/0213433 A1* | 7/2015 | Khan | .................. | H04L 9/0844 |
| | | | | 705/71 |
| 2015/0254640 A1* | 9/2015 | Cassano | ............. | G06Q 20/3672 |
| | | | | 705/71 |
| 2015/0310431 A1* | 10/2015 | Lakshmanan | ...... | G06Q 20/3226 |
| | | | | 705/71 |
| 2015/0324789 A1* | 11/2015 | Dvorak | .............. | G06Q 20/3274 |
| | | | | 705/67 |
| 2016/0014110 A1* | 1/2016 | Kurspahic | ............... | H04L 9/085 |
| | | | | 713/183 |
| 2016/0112413 A1* | 4/2016 | Wang | .................. | H04L 63/0846 |
| | | | | 713/171 |
| 2016/0212109 A1* | 7/2016 | Hird | ...................... | H04L 63/062 |
| 2017/0063531 A1* | 3/2017 | Sullivan | .................. | G06F 21/60 |
| 2019/0245688 A1* | 8/2019 | Patin | .................... | H04L 9/0637 |
| 2019/0318356 A1* | 10/2019 | Martin | .................. | H04L 9/3239 |
| 2020/0013052 A1* | 1/2020 | Fok | .................... | G06Q 20/3829 |
| 2020/0019959 A1* | 1/2020 | Fan | ...................... | G06Q 20/405 |
| 2020/0374113 A1* | 11/2020 | Noam | ................... | H04L 9/0847 |

FOREIGN PATENT DOCUMENTS

| | | | | |
|---|---|---|---|---|
| WO | WO-9933222 A1 * | 7/1999 | ........... | G07F 7/1008 |
| WO | WO-2011036179 A1 * | 3/2011 | ............. | G06Q 20/32 |
| WO | WO-2019106006 A1 * | 6/2019 | ......... | G06Q 30/0185 |

\* cited by examiner

CRYPTOCURRENCY SECURING METHOD AND DEVICE THEREOF

BACKGROUND

Digital currencies and the transactions thereof have become increasingly prevalent. It uses cryptography to secure digital currencies and verify transactions so that these digital currencies are referred to as cryptocurrency. In order to exchange cryptocurrency, corresponding cryptocurrency wallet is required.

Particularly, cryptocurrency wallets can be implemented by some storage hardware (e.g., cloud storage, or local storage such as hard driver disk/solid-state drive) designed to store public and private keys, which are used to receive and spend corresponding cryptocurrencies, respectively. For different purposes, different types of cryptocurrency wallets are developed and the most common types of cryptocurrency wallets cab be classified as Hot Wallet and Cold Wallet.

More specifically, Hot Wallet connects to the Internet directly for regular uses and trading in real-time. Although it is capable of providing a convenient access to cryptocurrency, a user-friendly interface, and a streamlined payment process, Hot Wallet is vulnerable to cyberattacks because it is on-line operation. Hence, it is at a high risk of losing cryptocurrency using Hot Wallet.

In contrast to Hot Wallet, Cold Wallet which is stored in a personal off-line storage does not connect to the Internet actively, and the infrequent uses and trades are achieved as non-real time. Therefore, Cold Wallet is capable of defending cyberattacks and is ideal for long-term safekeeping. Nevertheless, Cold Wallet lacks accessibility and flexibility, and is still vulnerable to physical damage, operation errors or theft while the Cold Wallet is kept personally without redundancy.

A general two-layer wallet system which includes Hot Wallet and Cold Wallet is therefore proposed. However, in normal circumstances, two-layer wallet system still has the described disadvantages of Hot and Cold Wallets since the required balance between security of Cold Wallet and real-time trading of Hot Wallet is not easy to reach. Moreover, there are still technical problems needed to be overcome in two-layer wallet system because the security architecture of two-layer wallet system is not robust enough.

SUMMARY

The present disclosure provides a cryptocurrency securing method for use in a cryptocurrency securing device. The method includes: receiving, by the cryptocurrency securing device, an encrypted personal identification number from a user device; decrypting, by the cryptocurrency securing device, the encrypted personal identification number via a first asymmetric key for deriving a personal identification number; decrypting, by the cryptocurrency securing device, an encrypted personal key via the personal identification number for deriving a personal key; and decrypting, by the cryptocurrency securing device, an encrypted cryptocurrency private key information via the personal key for deriving a cryptocurrency private key information.

In some embodiments, the method further includes: generating, by the cryptocurrency securing device, a first one-time key; encrypting, by the cryptocurrency securing device, the first one-time key via the first asymmetric key for deriving a first encrypted one-time key; and transmitting, by the cryptocurrency securing device, the first encrypted one-time key to the user device so that the user device is capable of decrypting the first encrypted one-time key via a second asymmetric key for deriving the first one-time key, and encrypting the personal identification number via the first one-time key and the second asymmetric key for deriving the encrypted personal identification number, wherein the first asymmetric key is paired with the second asymmetric key.

In some embodiments, the method further includes: decrypting, by the cryptocurrency securing device, the encrypted personal identification number via the first asymmetric key for deriving a sub-encrypted personal identification number; and decrypting, by the cryptocurrency securing device, the sub-encrypted personal identification number via the first one-time key for deriving the personal identification number.

In some embodiments, the method further includes: transmitting, by the cryptocurrency securing device, a second encrypted one-time key to a cloud server so that the cloud server is capable of decrypting the second encrypted one-time key via a third asymmetric key for deriving a second one-time key; receiving, by the cryptocurrency securing device, the second one-time key from the cloud server; decrypting, by the cryptocurrency securing device, a first encrypted hash factor data via the second one-time key for deriving a hash factor data; and decrypting, by the cryptocurrency securing device, the encrypted personal key via the personal identification number and the hash factor data for deriving the personal key.

In some embodiments, the method further includes: hashing, by the cryptocurrency securing device, the personal identification number and the hash factor data for deriving a hash key; and decrypting, by the cryptocurrency securing device, the encrypted personal key via the hash key for deriving the personal key.

In some embodiments, the method further includes: generating, by the cryptocurrency securing device, a third one-time key; encrypting, by the cryptocurrency securing device, the hash factor data via the third one-time key for deriving a second encrypted hash factor data; and encrypting, by the cryptocurrency securing device, the third one-time key via a fourth asymmetric key for deriving a third encrypted one-time key, wherein the third asymmetric key is paired with the fourth asymmetric key.

To achieve the aforesaid objective, the present disclosure provides a cryptocurrency securing device. The cryptocurrency securing device includes a storage module, a transceiver and a processor which are connected with each other electrically. The storage module is configured to store a first asymmetric key, an encrypted personal key, and an encrypted cryptocurrency private key information. The transceiver is configured to receive an encrypted personal identification number from a user device. The processor is configured to: decrypt the encrypted personal identification number via the first asymmetric key for deriving a personal identification number; decrypt the encrypted personal key via the personal identification number for deriving a personal key; and decrypt the encrypted cryptocurrency private key information via the personal key for deriving a cryptocurrency private key information.

In some embodiment, the processor is further configured to: generate a first one-time key; and encrypt the first one-time key via the first asymmetric key for deriving a first encrypted one-time key. The transceiver is further configured to transmit the first encrypted one-time key to the user device so that the user device is capable of decrypting the first encrypted one-time key via a second asymmetric key for deriving the first one-time key, and encrypting the personal identification number via the first one-time key and the second asymmetric key for deriving the encrypted personal identification number, wherein the first asymmetric key is paired with the second asymmetric key.

In some embodiment, the processor is further configured to: decrypt the encrypted personal identification number via the first asymmetric key for deriving a sub-encrypted personal identification number; and decrypt the sub-encrypted personal identification number via the first one-time key for deriving the personal identification number.

In some embodiment, the storage module is further configured to store a second encrypted one-time key and a first encrypted hash factor data. The transceiver is further configured to: transmit the second encrypted one-time key to a cloud server so that the cloud server is capable of decrypting the second encrypted one-time key via a third asymmetric key for deriving a second one-time key; receive the second one-time key from the cloud server. The processor is further configured to: decrypt the first encrypted hash factor data via the second one-time key for deriving a hash factor data; and decrypt the encrypted personal key via the personal identification number and the hash factor data for deriving the personal key.

In some embodiment, the processor is further configured to: hash the personal identification number and the hash factor data for deriving a hash key; and decrypt the encrypted personal key via the hash key for deriving the personal key.

In some embodiment, the processor is further configured to: generate a third one-time key; encrypt the hash factor data via the third one-time key for deriving a second encrypted hash factor data; and encrypt the third one-time key via a fourth asymmetric key for deriving a third encrypted one-time key, wherein the third asymmetric key is paired with the fourth asymmetric key; wherein the storage module is further configured to store the second encrypted hash factor data and the third encrypted one-time key.

In some embodiment, the storage module further includes at least one storage. The at least one storage is configured to store the encrypted personal key, the first encrypt hash factor data, the second encrypt hash factor data, the third encrypted one-time key and the encrypted cryptocurrency private key information.

Another primary objective of the present disclosure is to provide a cryptocurrency securing method for use in a cryptocurrency securing device. The method includes: receiving, by the cryptocurrency securing device, a personal identification number and a cryptocurrency private key information from a user device; generating, by the cryptocurrency securing device, a personal key corresponding to the personal identification number; encrypting, by the cryptocurrency securing device, the cryptocurrency private key information via the personal key for deriving an encrypted cryptocurrency private key information; and encrypting, by the cryptocurrency securing device, the personal key via the personal identification number for deriving an encrypted personal key.

In some embodiment, the method includes: generating, by the cryptocurrency securing device, a hash factor data corresponding to the personal identification number; and encrypting, by the cryptocurrency securing device, the personal key via the personal identification number and the hash factor data for deriving the encrypted personal key.

In some embodiments, the method further includes: hashing, by the cryptocurrency securing device, the personal identification number and the hash factor data for deriving a hash key; and encrypting, by the cryptocurrency securing device, the personal key via the hash key for deriving the encrypted personal key.

In some embodiments, the method further includes: generating, by the cryptocurrency securing device, an one-time key; encrypting, by the cryptocurrency securing device, the hash factor data via the one-time key for deriving an encrypted hash factor data; and encrypting, by the cryptocurrency securing device, the one-time key via an asymmetric for deriving an encrypted one-time key.

To achieve the aforesaid objective, the present disclosure further provides a cryptocurrency securing device. The cryptocurrency securing device includes a storage module, a transceiver and a processor which are connected with each other electrically. The transceiver is configured to receive a personal identification number and a cryptocurrency private key information from a user device. The processor is configured to: generate a personal key corresponding to the personal identification number; encrypt the cryptocurrency private key information via the personal key for deriving an encrypted cryptocurrency private key information; and encrypt the personal key via the personal identification number for deriving an encrypted personal key. The storage module is configured to store the encrypted cryptocurrency private key information and the encrypted personal key.

In some embodiment, the processor is further configured to: generate a hash factor data corresponding to the personal identification number; and encrypt the personal key via the personal identification number and the hash factor data for deriving the encrypted personal key. The storage module is further configured to store the encrypted personal key.

In some embodiment, the processor is further configured to: hash the personal identification number and the hash factor data for deriving a hash key; and encrypt the personal key via the hash key for deriving the encrypted personal key.

In some embodiment, the processor is further configured to: generate an one-time key; encrypt the hash factor data via the one-time key for deriving an encrypted hash factor data; and encrypt the one-time key via an asymmetric for deriving an encrypted one-time key. The storage module is further configured to store the encrypted hash factor data and the encrypted one-time key.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1A:
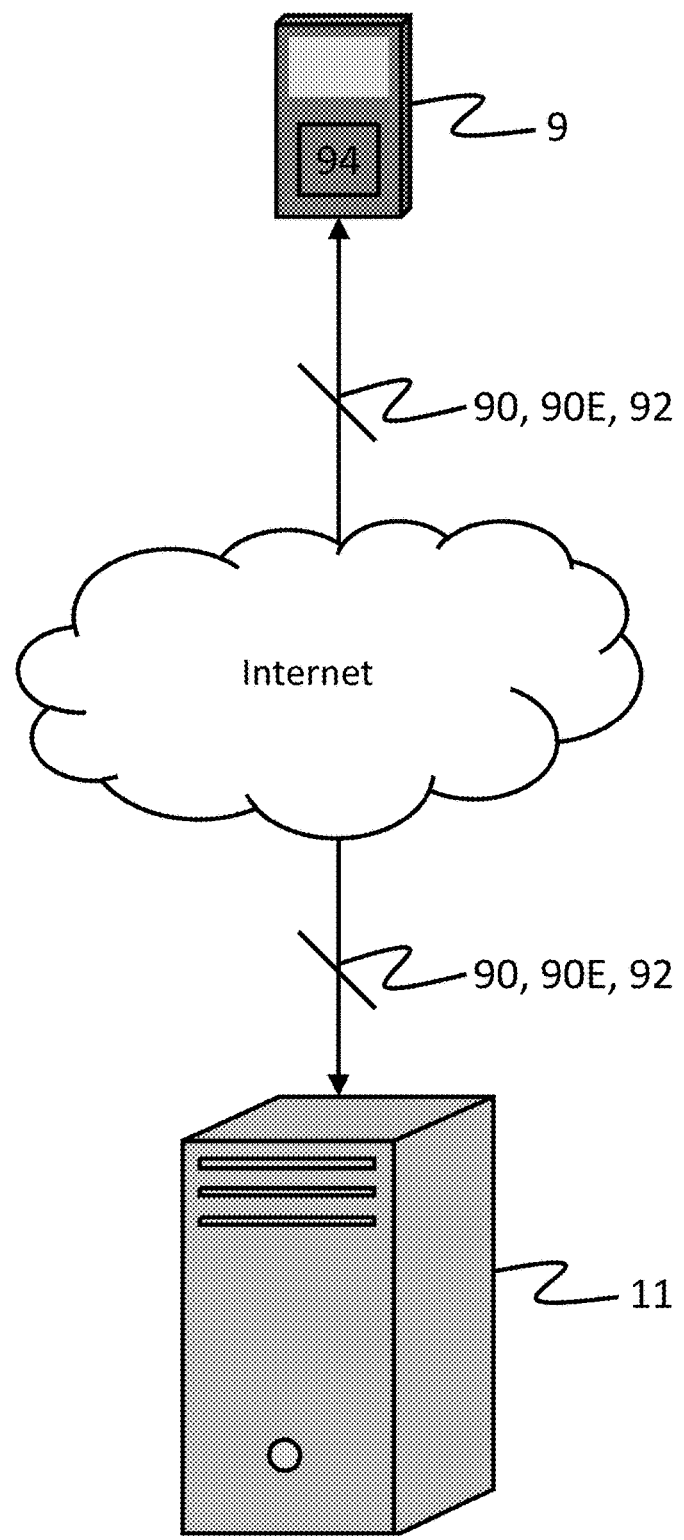
FIG. 1A is a schematic view of a cryptocurrency securing device, in accordance with some embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Embodiments of the present disclosure are discussed in detail below. It shall be appreciated, however, that the present disclosure provides many applicable inventive concepts that can be embodied in a wide variety of specific contexts. The specific embodiments discussed are merely illustrative and do not limit the scope of the disclosure.

Figure 1B:
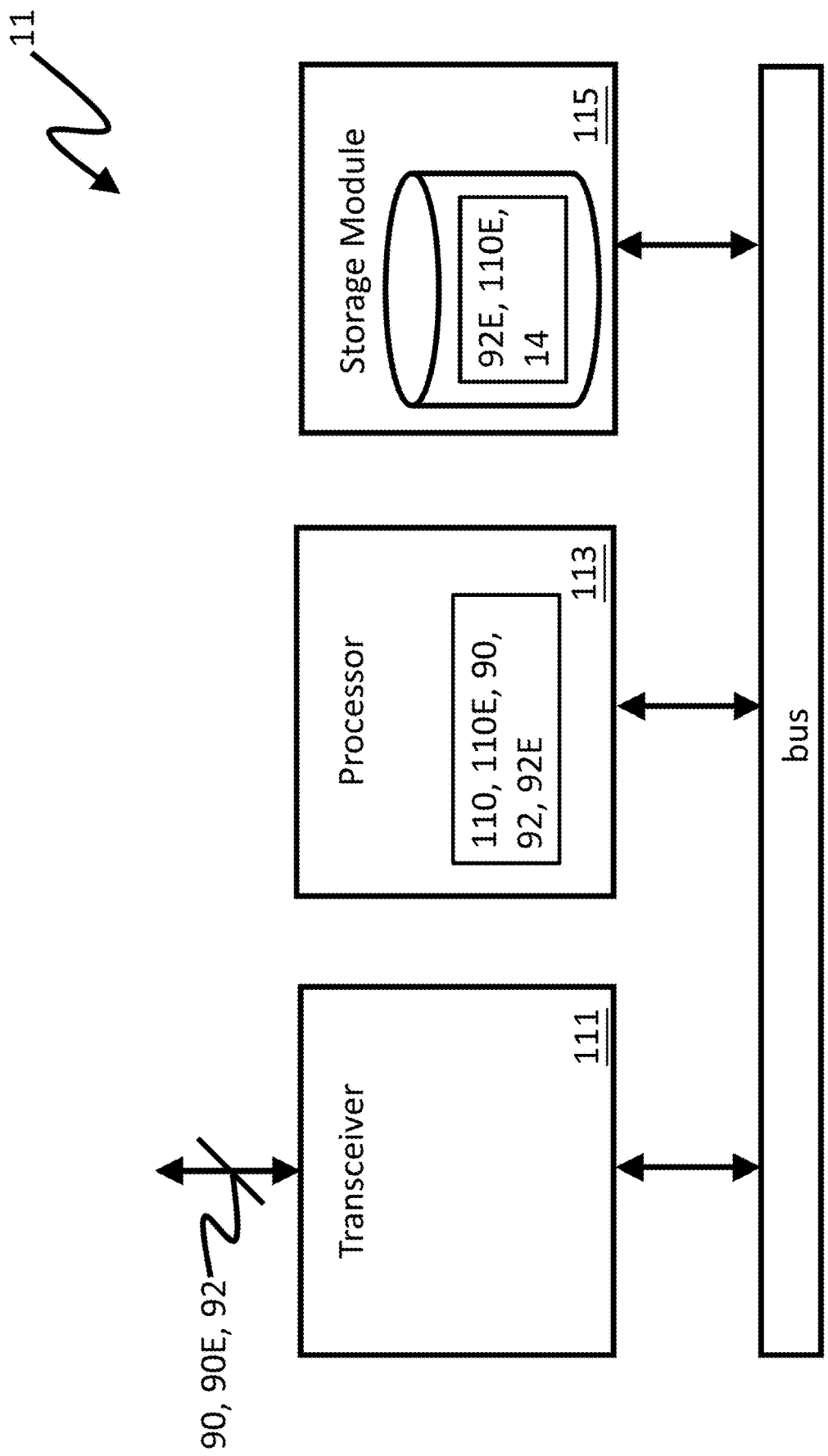
FIG. 1B is a block diagram of the cryptocurrency securing device, in accordance with some embodiments of the present disclosure.

Please refer to FIG. 1A and FIG. 1B for some embodiments of the present disclosure. FIG. 1A is a schematic view of a cryptocurrency securing device 11 of some embodiments. The cryptocurrency securing device 11 connects with a user device 9 through Internet. FIG. 1B is a block diagram of the cryptocurrency securing device 11 of some embodiments. The cryptocurrency securing device 11 includes a transceiver 111, a processor 113, and a storage module 115 which are electrically connected together (e.g., electrically connected via bus), and the interactions therebetween will be further described hereinafter.

In some embodiment, the cryptocurrency securing device 11 performs two procedures which are initiation procedure and utilization procedure. It shall be note that, for each cryptocurrency private key, the initiation procedure is performed once for encrypting the cryptocurrency private key and the utilization procedure may be performed every time the cryptocurrency private key is needed for transaction.

Figure 1C:
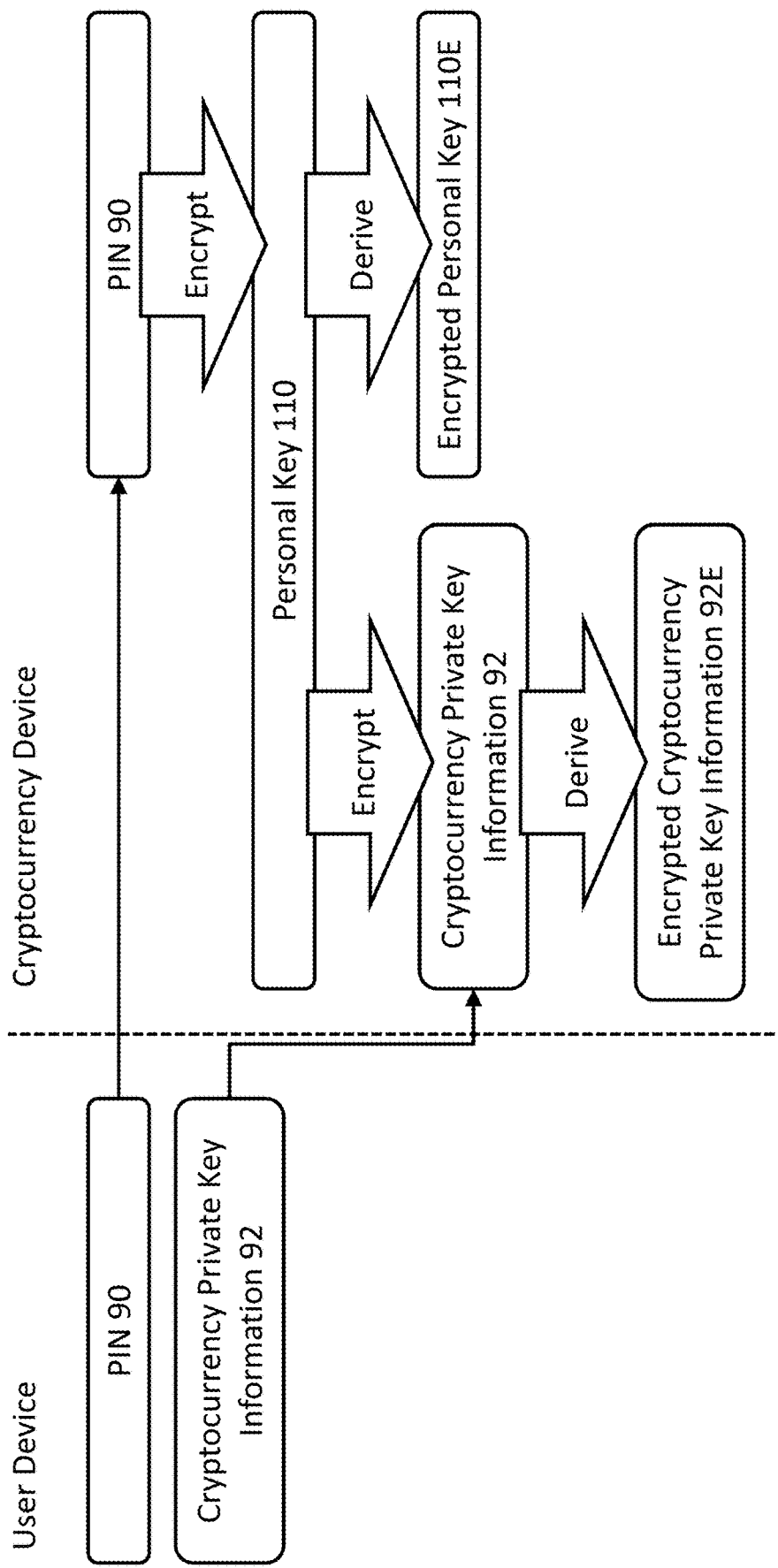
FIG. 1C is a schematic view of the operation of the initiation procedure of the cryptocurrency securing device, in accordance with some embodiments of the present disclosure.

Accordingly, when a user needs to use the cryptocurrency securing device 11 for securing his/her own cryptocurrency, an initiation procedure for encrypting the cryptocurrency private key is required. Please refer to FIG. 1C together, which is a schematic view of the operation of the initiation procedure of the cryptocurrency securing device 11 of some embodiments. First, after the user legally logs in to the cryptocurrency securing device 11, the transceiver 111 of the cryptocurrency securing device 11 receives a personal identification number 90 and a cryptocurrency private key information 92 of the user from the user device 9.

It shall be particularly appreciated that, in some embodiments of the initiation procedure, the personal identification number 90 is set as an user secret code (i.e., password), and it is assumed that the personal identification number 90 and the cryptocurrency private key information 92 are transmitted under a secured environment from the user device 9 to the cryptocurrency securing device 11 (e.g., use of pair of asymmetric keys, Secure Sockets Layer protocol, or direct communication without Internet between the user device 9 and the cryptocurrency securing device 11).

Next, the processor 113 of the cryptocurrency securing device 11 generates a personal key 110 corresponding to the personal identification number 90. More specifically, the personal key 110 is generated randomly and uniquely for the personal identification number 90. After the generation of the personal key 110, the personal key 110 and the cryptocurrency private key information 92 are encrypted for enhancing the robustness of the cryptocurrency securing device 11.

In an embodiment, the processor 113 of the cryptocurrency securing device 11 encrypts the cryptocurrency private key information 92 via the personal key 110 for deriving an encrypted cryptocurrency private key information 92E. On the other hands, the processor 113 of the cryptocurrency securing device 11 encrypts the personal key 110 via the personal identification number 90 for deriving an encrypted personal key 110E. The storage module 115 stores the encrypted cryptocurrency private key information 92E and the encrypted personal key 110E for later use. After the encrypting and the storing operations, the initiation procedure is completed.

Figure 1D:
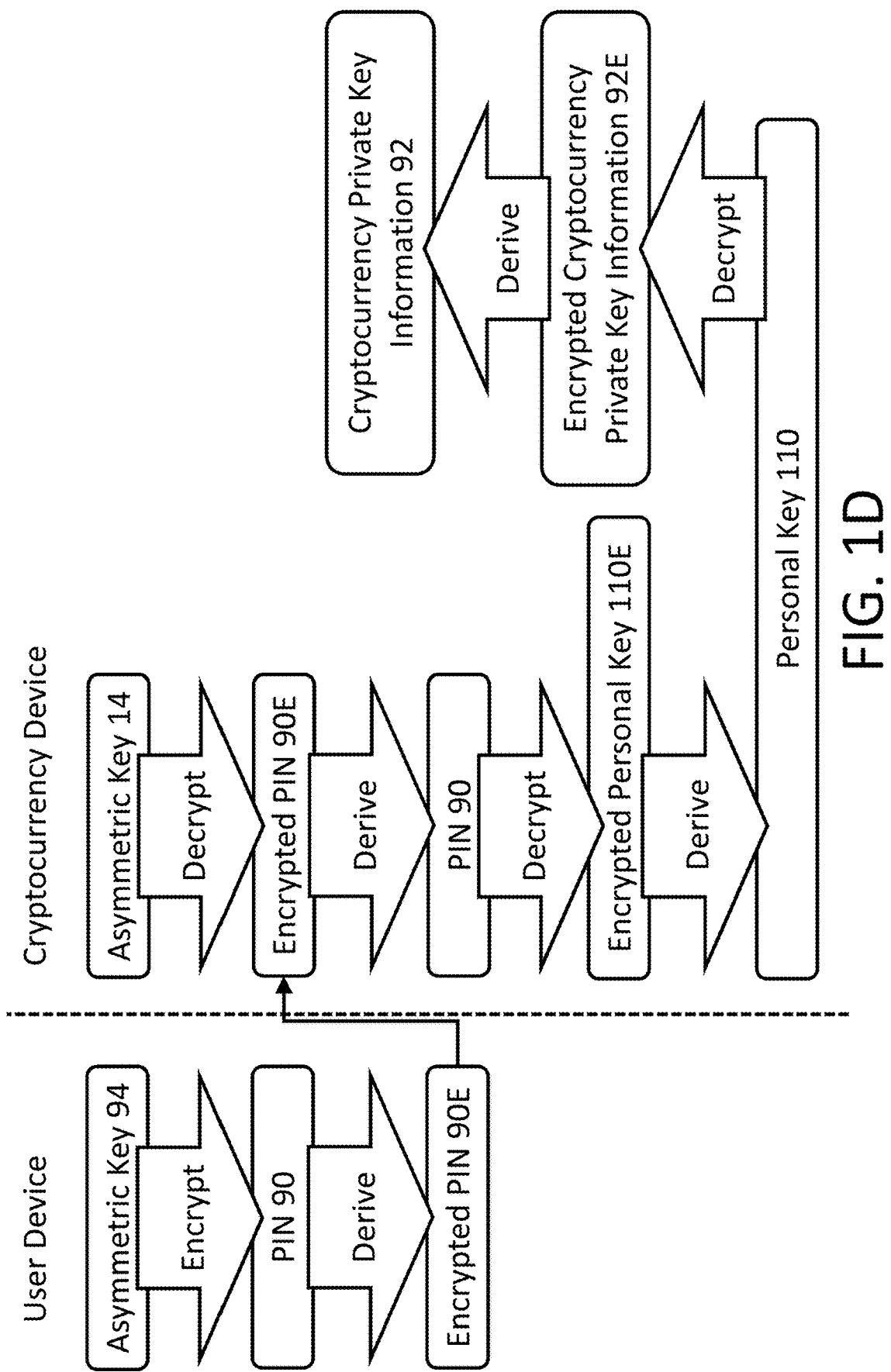
FIG. 1D is a schematic view of the operation of the utilization procedure of the cryptocurrency securing device, in accordance with some embodiments of the present disclosure.

Afterwards, when the user needs the cryptocurrency private key information 92 for transaction, the user shall perform a utilization procedure. Please refer to FIG. 1D together, which is a schematic view of the operation of the utilization procedure of the cryptocurrency securing device 11 of some embodiments. In an embodiment, the user inputs the personal identification number 90 into the user device 9. Then, the user device 9 encrypts the personal identification number 90 via an asymmetric key 94 for deriving an encrypted personal identification number 90E and transmits the encrypted personal identification number 90E to the cryptocurrency securing device 11.

On the other hand, the transceiver 111 of the cryptocurrency securing device 11 then receives the encrypted personal identification number 90E. In addition, the processor 113 of the cryptocurrency securing device 11 decrypts the encrypted personal identification number 90E via an asymmetric key 14 stored in the storage module 115 for deriving the personal identification number 90. It shall be appreciated that, in some embodiments, the asymmetric keys 94 and 14 are pair of asymmetric keys, and are kept in the user device 9 and the cryptocurrency securing device 11, respectively.

Next, the processor 113 of the cryptocurrency securing device 11 decrypts the encrypted personal key 110E via the personal identification number 90 for deriving the personal key 110, and then decrypts the encrypted cryptocurrency private key information 92E via the personal key 110 for deriving the cryptocurrency private key information 92. Therefore, the cryptocurrency private key information 92 can be used for transaction.

It shall be further emphasized that, in some embodiments, each user has his/her own unique identification recorded in the cryptocurrency device 11, and the related information (such as the asymmetric key 14, the encrypted personal key 110E, the encrypted cryptocurrency private key information 92E) shall be generated, retrieved or utilized based on the unique identification while the user logs in to the cryptocurrency device 11. The application of the unique identifications for different users to utilize related information shall be appreciated by persons having ordinary skill in the art based on the above disclosure, and thus will not be further described herein.

Figure 2A:
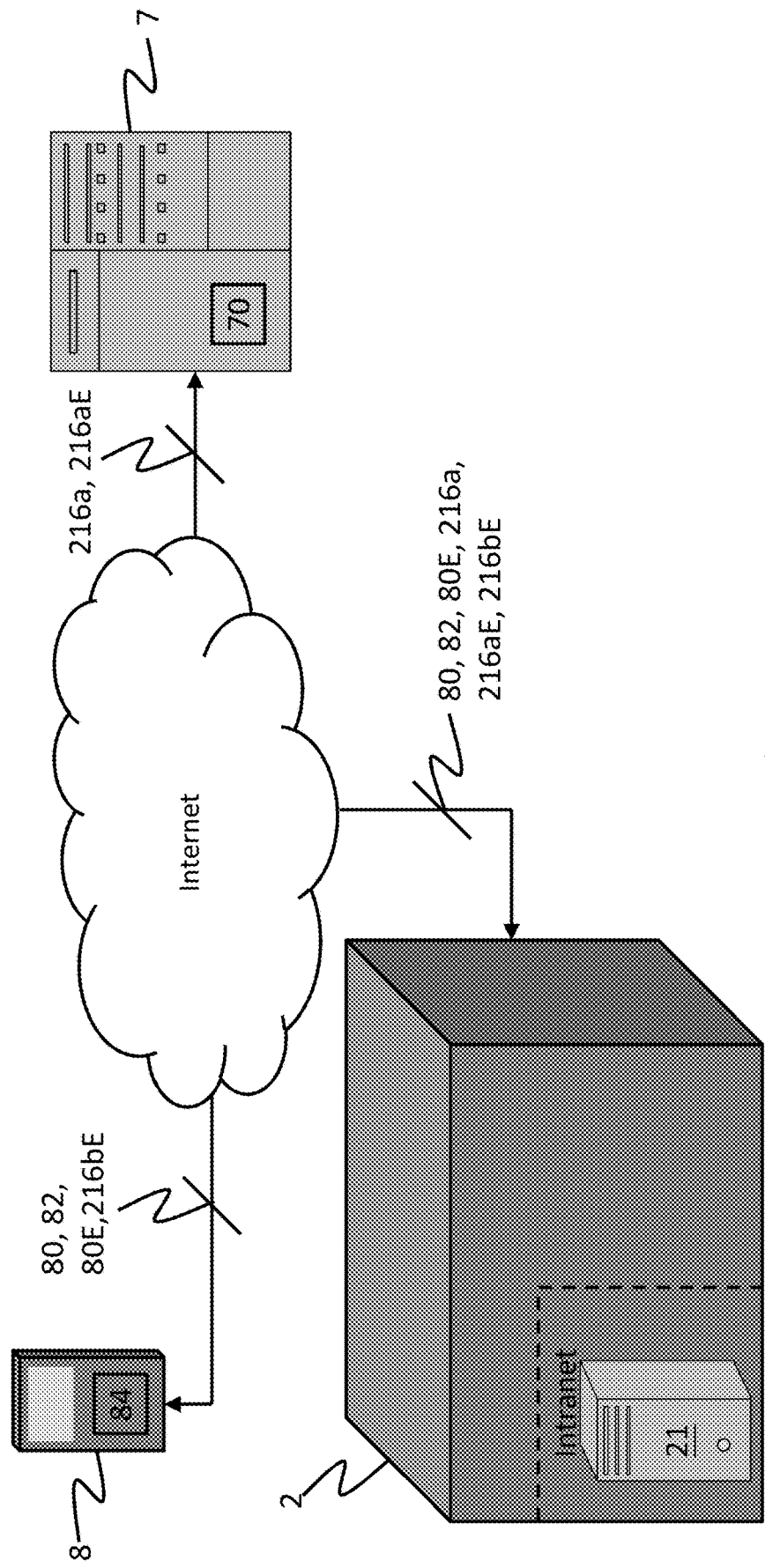
FIG. 2A is a schematic view of a cryptocurrency securing device, in accordance with some embodiments of the present disclosure.
Figure 2B:
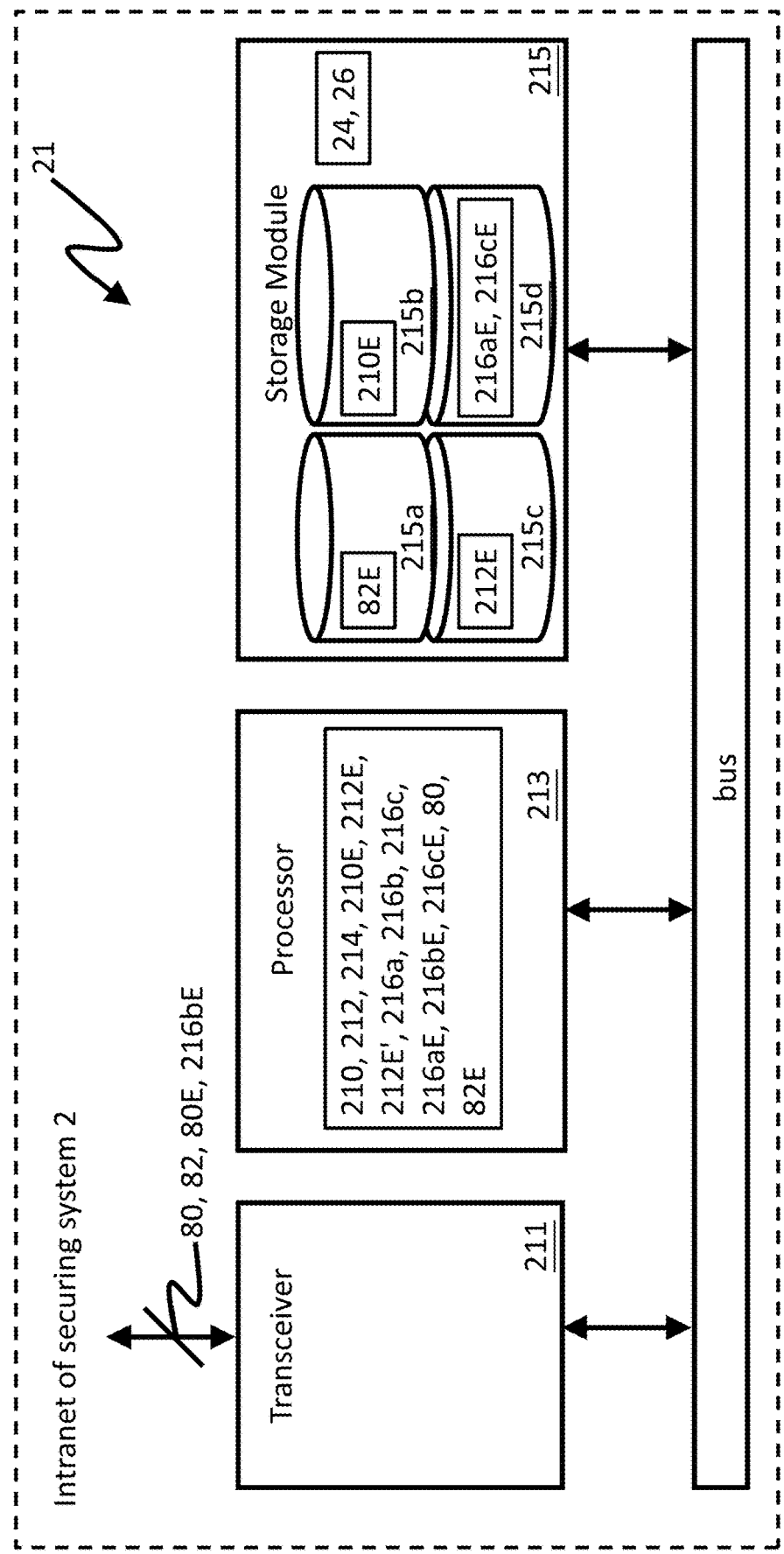
FIG. 2B is a block diagram of the cryptocurrency securing device, in accordance with some embodiments of the present disclosure.

Please refer to FIG. 2A and FIG. 2B for some embodiments of the present disclosure. FIG. 2A is a schematic view of a cryptocurrency securing device 21 of some embodiments. The cryptocurrency securing device 21 is operated under an Intranet of a securing system 2, and connects with a user device 8 and a cloud server 7 via the securing system 2 through Internet.

FIG. 2B is a block diagram of the cryptocurrency securing device 2 of some embodiments. The cryptocurrency securing device 21 includes a transceiver 211, a processor 213 and a storage module 215 which are electrically connected together (e.g., electrically connected via bus), and the storage module 215 includes four independent storages 215a~215d for reducing the risk of cyberattack. The interactions between the elements and details of operations will be further described hereinafter.

Figure 2C:
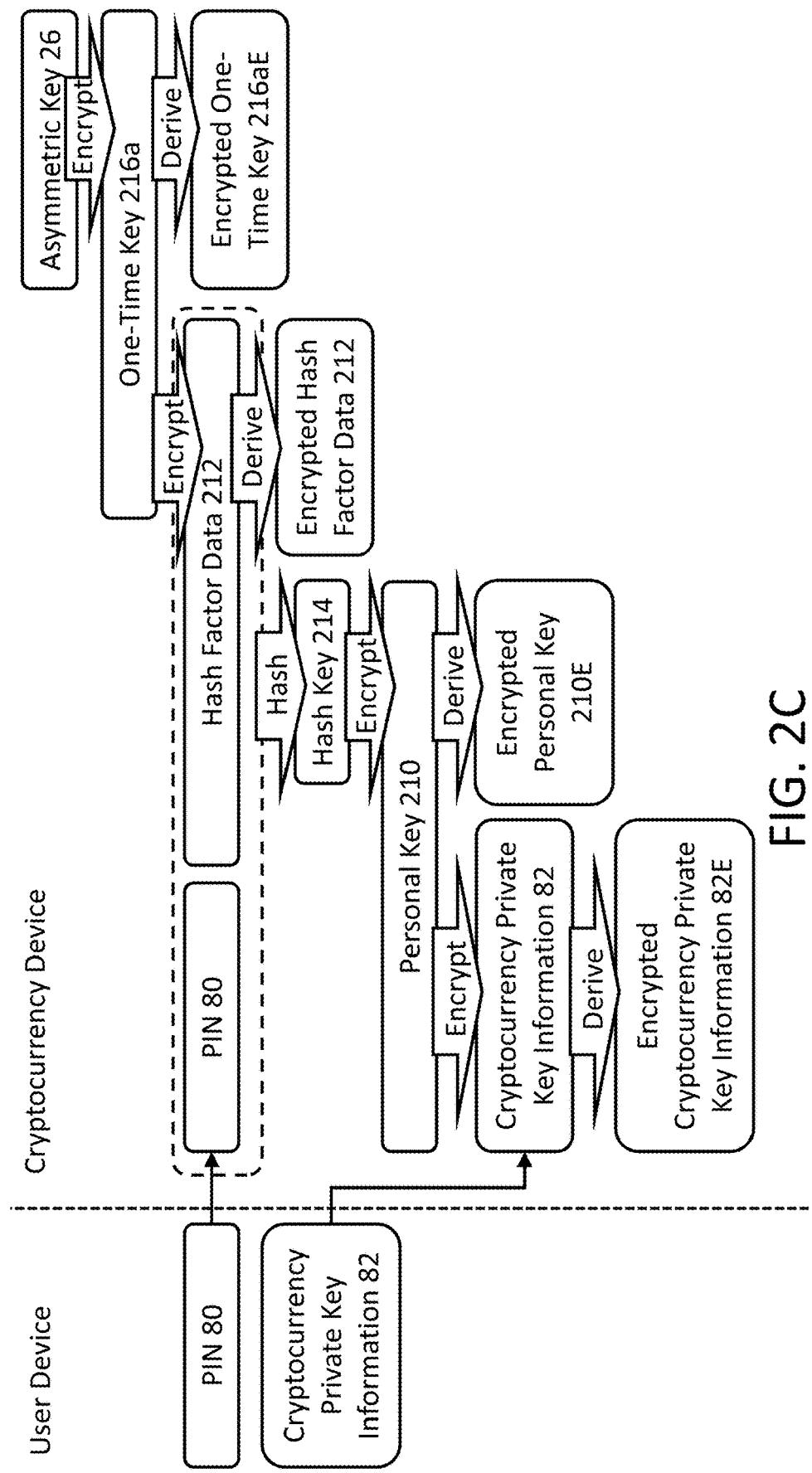
FIG. 2C is a schematic view of the operation of the initiation procedure of the cryptocurrency securing device, in accordance with some embodiments of the present disclosure.

In some embodiments, when a user needs to use the cryptocurrency securing device 21 for securing his/her own cryptocurrency, an initiation procedure for encrypting the cryptocurrency private key is required. Please refer to FIG. 2C together, which is a schematic view of the operation of the initiation procedure of the cryptocurrency securing device 21 of some embodiments. First, the user legally logs in to the securing system 2 under a secured environment for reaching the cryptocurrency securing device 21, and the transceiver 211 of the cryptocurrency securing device 21 receives a personal identification number 80 and a cryptocurrency private key information 82 of the user from the user device 8.

Next, the processor 213 of the cryptocurrency securing device 21 generates a personal key 210 and a hash factor data 212 corresponding to the personal identification number 80. More specifically, the personal key 210 and the hash factor data 212 are generated randomly and uniquely for the personal identification number 80. After generating the personal key 210 and the hash factor data 212, the personal key 210 and the cryptocurrency private key information 82 are encrypted.

In an embodiment, the processor 213 of the cryptocurrency securing device 21 encrypts the cryptocurrency private key information 82 via the personal key 210 for deriving an encrypted cryptocurrency private key information 82E. On the other hand, the personal key 210 is encrypted in a more robust procedure. In some embodiments, the processor 213 of the cryptocurrency securing device 21 hashes the personal identification number 80 with the hash factor data 212 for deriving a hash key 214, and then encrypts the personal key 210 via the hash key 214 for deriving an encrypted personal key 210E.

Moreover, in some embodiments, the hash factor data 212 is inserted in the personal identification number 80, and the personal identification number 80 with the hash factor data 212 is hashed by a hash function for deriving the hash key 214. The personal key 210 is then encrypted via the hash key 214 for obtaining the encrypted personal key 210E.

In addition, in some embodiments, the hash factor data 212 is further encrypted for improving the security of the cryptocurrency securing device 21. Specifically, the processor 213 of the cryptocurrency securing device 21 generate a one-time key 216a, and encrypts the hash factor data 212 via the one-time key 216a for deriving an encrypted hash factor data 212E.

Moreover, in some embodiments, in case the cryptocurrency securing device 21 could be compromised, the utilization of the cloud server 7 is introduced for enhancing the security. In detail, after utilizing the one-time key 216a, the processor 213 of the cryptocurrency securing device 21 encrypts the one-time key 216a via an asymmetric key 26 for deriving an encrypted one-time key 216aE. Therefore, the encrypted one-time key 216aE cannot be decrypted at the end of the cryptocurrency securing device 21 since the key used to encrypt the one-time key 216a is an asymmetric key, but the encrypted one-time key 216aE can be only decrypted at the end of the cloud server 7 who has an asymmetric key 70 paired with the asymmetric key 26.

Accordingly, the storage 215a-215d stores the encrypted cryptocurrency private key information 82E, the encrypted personal key 210E, the encrypted hash factor data 212E and the encrypted one-time key 216aE respectively for later use. After the encrypting and the storing operations, the initiation procedure is completed.

Figure 2D:
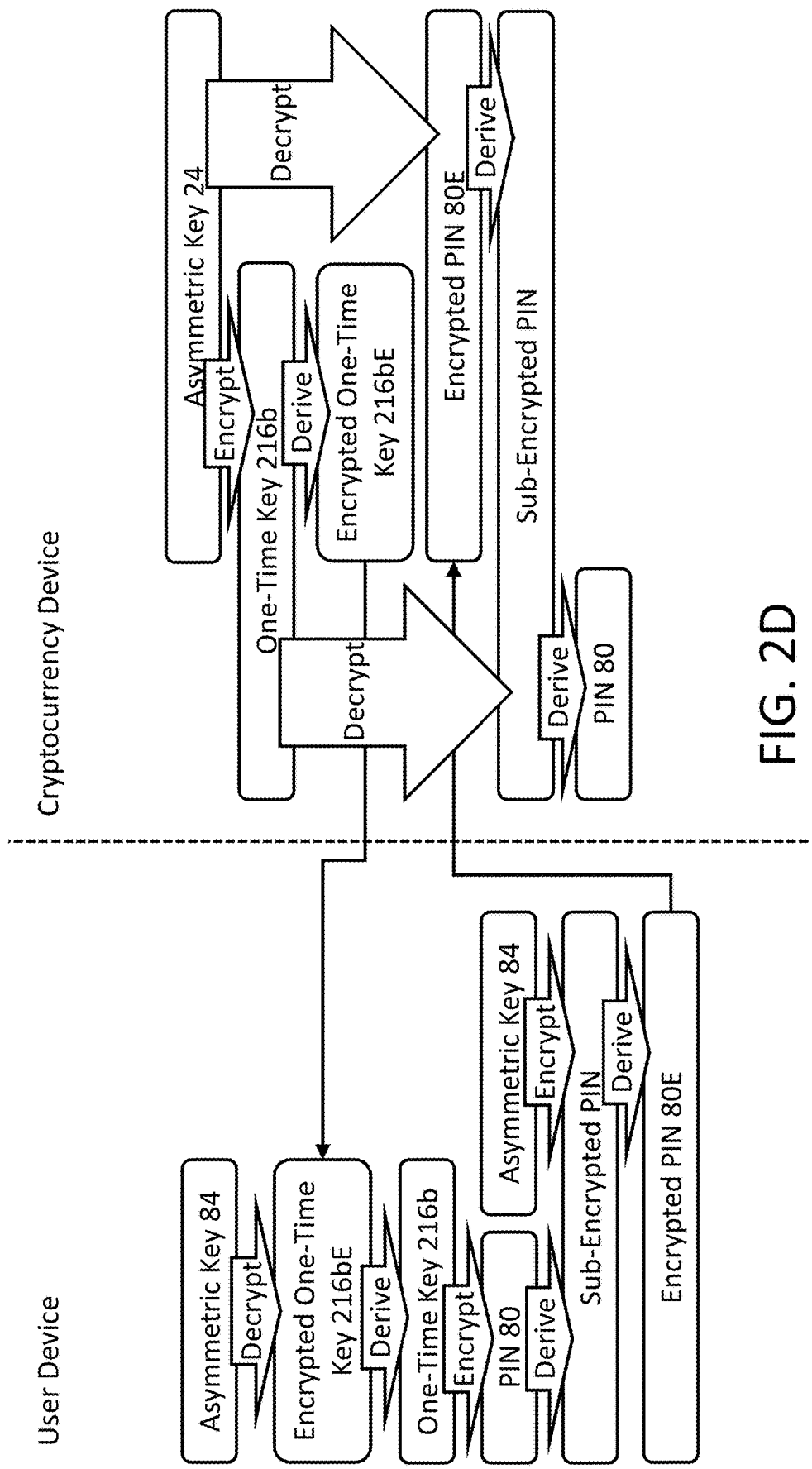
FIGS. 2D and 2E are schematic views of the operation of the utilization procedure of the cryptocurrency securing device, in accordance with some embodiments of the present disclosure.
Figure 2E:
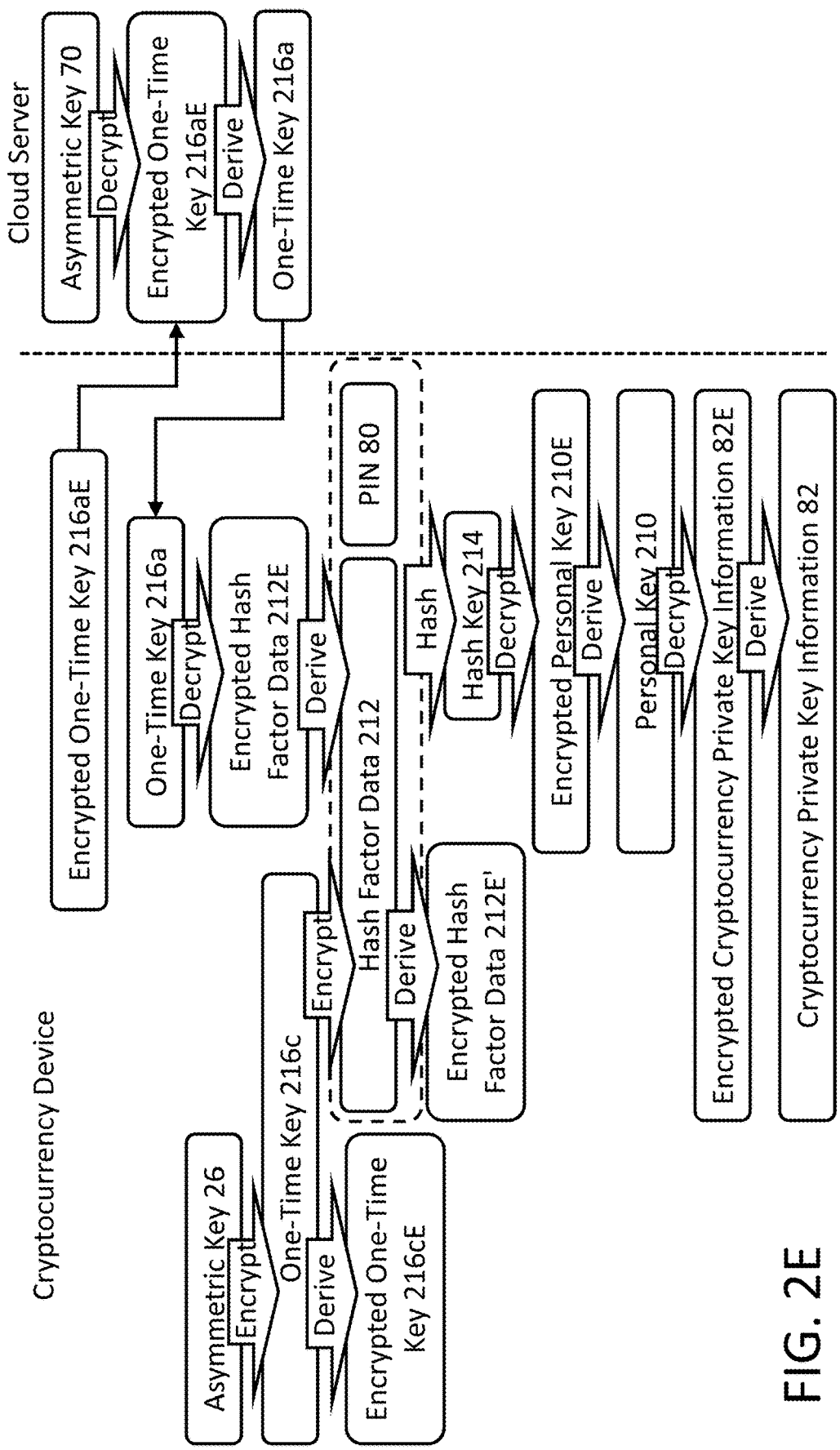

Afterwards, when the user needs the cryptocurrency private key information 82 for transaction, the user shall perform a utilization procedure. Please refer to FIGS. 2D and 2E together, which are schematic views of the operation of the utilization procedure of the cryptocurrency securing device 21 of some embodiments. In detail, the user logs in to the securing system 2 for reaching the cryptocurrency securing device 21. After being aware of the user's login, the processor 213 of the cryptocurrency securing device 21 generates an one-time key 216b, and encrypts the one-time key 216b via an asymmetric key 24 stored in the storage module 215 for deriving an encrypted one-time key 216bE.

Then, the transceiver 211 of the cryptocurrency securing device 21 transmits the encrypted one-time key 216bE to the user device 8 through the securing system 2. Subsequently, the user device 8 decrypts the encrypted one-time key 216bE via an asymmetric key 84 paired with the asymmetric key 24 for deriving the one-time key 216b, and encrypts the personal identification number 82 via the one-time key 216b and the asymmetric key 84 for deriving an encrypted personal identification number 80E.

More particularly, after deriving the one-time key 216b, the user device 8 encrypts the personal identification number 82 via the one-time key 216b for deriving a sub-encrypted personal identification number (not shown), and then encrypts the sub-encrypted personal identification number via the asymmetric key 84 for deriving the encrypted personal identification number 80E. Next, the user device 8 transmits the encrypted personal identification number 80E to the cryptocurrency securing device 21 through the securing system 2.

On the other hand, the transceiver 211 of the cryptocurrency securing device 21 then receives the encrypted personal identification number 80E, and the processor 213 of the cryptocurrency securing device 21 decrypts the encrypted personal identification number 80E via the asymmetric key 24 for deriving the sub-encrypted personal identification number, and decrypts the sub-encrypted personal identification number via the one-time key 216b for deriving the personal identification number 80.

In the next stage, a corresponding hash factor data is needed for further decryption. Particularly, since the encrypted hash factor data 212E can be only decrypted via the one-time key 216a, the one-time key 216a must be obtained first. Because the storage 215d of the cryptocurrency securing device 21 only stores the encrypted one-time key 216aE while the encrypted one-time key 216aE can be only decrypted at the end of the cloud server 7, the transceiver 211 of the cryptocurrency securing device 21 transmits the encrypted one-time key 216aE to the cloud server 7 through the securing system 2.

Afterwards, the cloud server 7 decrypts the encrypted one-time key 216aE via the asymmetric key 70 for deriving the one-time key 216a, and transmits the one-time key 216a back to the cryptocurrency securing device 21 through the securing system 2. On the other hand, the transceiver 211 of the cryptocurrency securing device 21 receives the one-time key 216a from the cloud server 7, and then the processor 213 of the cryptocurrency securing device 21 decrypts the encrypted hash factor data 212E via the one-time key 216a for deriving the hash factor data 212.

After deriving the hash factor data 212, the processor 213 of the cryptocurrency securing device 21 decrypts the encrypted personal key 210E via the personal identification number 80 and the hash factor data 211 for deriving the personal key 210. Specifically, the processor 213 of the cryptocurrency securing device 21 hashes the personal identification number 80 with the hash factor data 212 for deriving the hash key 214, and then decrypts the encrypted personal key 210E via the hash key 214 for deriving the personal key 210.

For more details, in some embodiments, the hash factor data 212 is inserted in the personal identification number 80, and the personal identification number 80 with the hash factor data 212 is hashed by the hash function for deriving the hash key 214. Then the encrypted personal key 210E is decrypted via the hash key 214 for obtaining the personal key 210. After obtaining the personal key 210, the processor 213 of the cryptocurrency securing device 21 decrypts the encrypted cryptocurrency private key information 82E via the personal key 210 for deriving the cryptocurrency private key information 82. Therefore, the cryptocurrency private key information 82 can be used for transaction.

In addition, after being utilized, the hash factor data 212 is further encrypted. Particularly, the processor 213 of the cryptocurrency securing device 21 generate a one-time key 216c, and encrypts the hash factor data 212 via the one-time key 216c for deriving an encrypted hash factor data 212E'. Then the processor 213 of the cryptocurrency securing device 21 encrypts the one-time key 216c via the asymmetric key 26 for deriving an encrypted one-time key 216cE, and the storage 215d stores the encrypted one-time key 216cE. Therefore, the encrypted one-time key 216cE is kept safely at the end of the cryptocurrency securing device 21 since the encrypted one-time key 216cE can only be decrypted by the cloud server 7 who has the asymmetric key 70.

It shall be further emphasized that, in some embodiments, the cryptocurrency private key information 82 includes at least one cryptocurrency private key (not shown) corresponding to at least one cryptocurrency on the blockchain. More, the cryptocurrency private key information 82 can further include a mnemonic word data (not shown) of the at least one cryptocurrency private key. In detail, the mnemonic word data is the combination of words generated by inputting the at least one cryptocurrency private key into a converting function (e.g., Bitcoin Improvement Proposals 39, BIP-39).

Similarly, in some embodiments, each user has his/her own unique identification recorded in the cryptocurrency device 11, and the related information (such as the asymmetric key 24, the asymmetric key 26, the encrypted one-time key 216aE, the encrypted hash factor data 212E, the encrypted personal key 210E, the encrypted cryptocurrency private key information 82E) shall be generated, retrieved or utilized based on the unique identification while the user logs in to the cryptocurrency device 11. The application of the unique identifications for different users to utilize related information shall be appreciated by those who skilled in the art depending on the above disclosure, and thus will not be further described herein.

It shall be particularly appreciated that the processors mentioned in the above embodiments may be central processing unit (CPU), other hardware circuit elements capable of executing relevant instructions, or combination of computing circuits that shall be well-appreciated by those skilled in the art based on the above disclosures. Moreover, the storage module and the storage mentioned in the above embodiments may be non-volatile storages (e.g., hard driver disk or solid-state drive) for storing data. Further, the transceiver may be physical transmission circuit used for transmitting data. However, it is not intended to limit the hardware implementation embodiments of the present disclosure.

Furthermore, the encryptions/decryptions described in the above embodiments can be achieved via Advanced Encryption Standard (e.g., AES-256) or RSA (e.g., RSA-4096 for asymmetric keys) while AES is used for symmetric encryptions/decryption (e.g., encryption/decryption of personal identification numbers, one-time keys, personal keys, hash keys) and RSA is used for asymmetric encryptions/decryption (e.g., encryption/decryption of asymmetric keys). Further, the hash function described in the above embodiments can be achieved via Secure Hash Algorithm (e.g., SHA-256). How to encrypt/decrypt/hash data based on AES/RSA/SHA algorithms shall be appreciated by those skilled in the art based on the above disclosure, and thus will not be further described herein.

In addition, each of the one-time keys described in the above embodiments is an event-based (e.g., one-time keys 216a, 216c)/time-based (e.g., one-time key 216b) one-time key and can be used once only. More specifically, as for event-based/time-based one-time keys, after being used for decrypting messages, these keys become useless. Further, the time-based one-time keys become useless as well after a designated time interval. How to use one-time key for encryption/decryption shall be appreciated by those skilled in the art based on the above disclosure, and thus will not be further described herein.

Figure 3A:
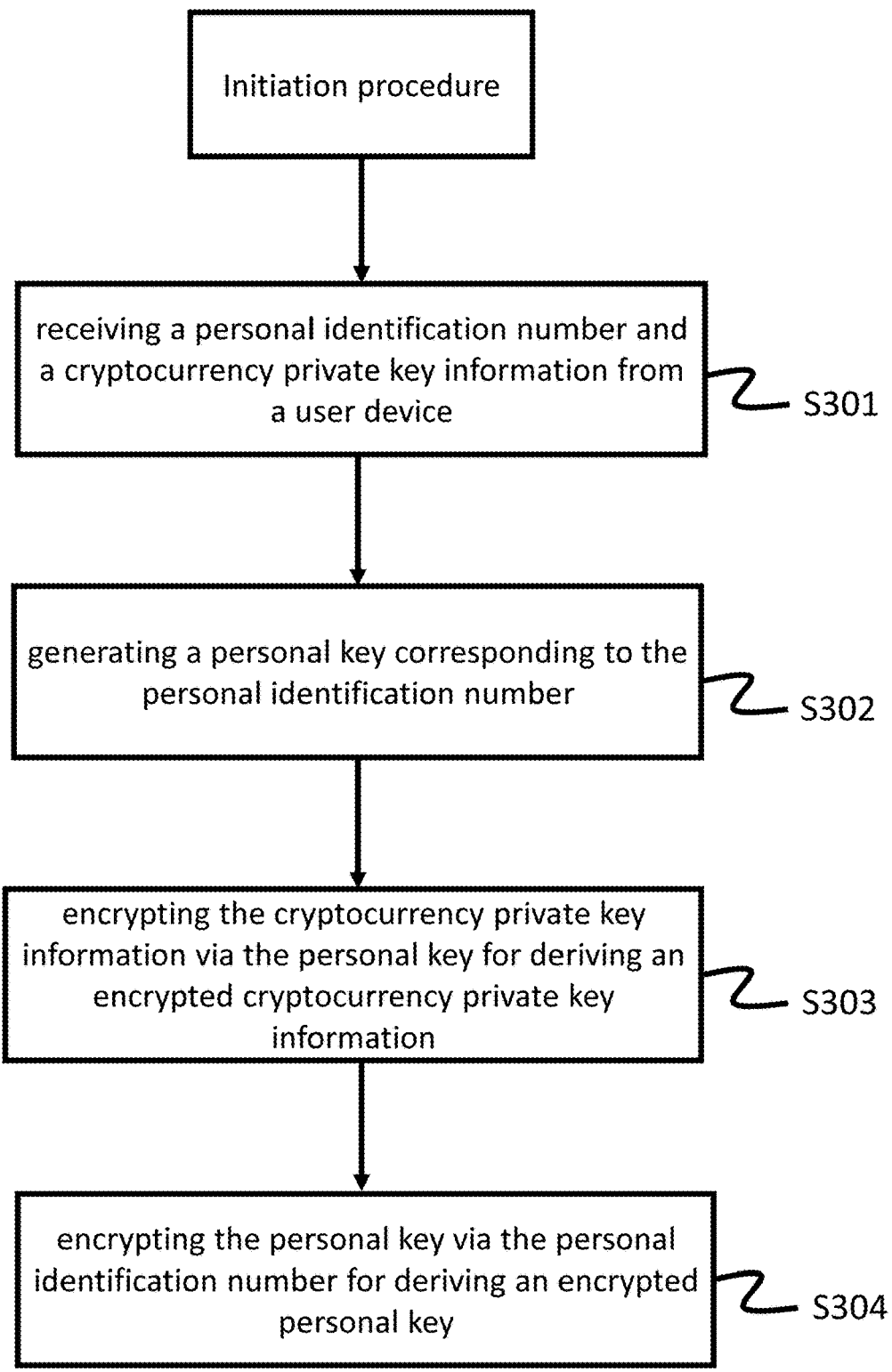
FIGS. 3A and 3B are flowchart diagrams, in accordance with some embodiments of the present disclosure.
Figure 3B:
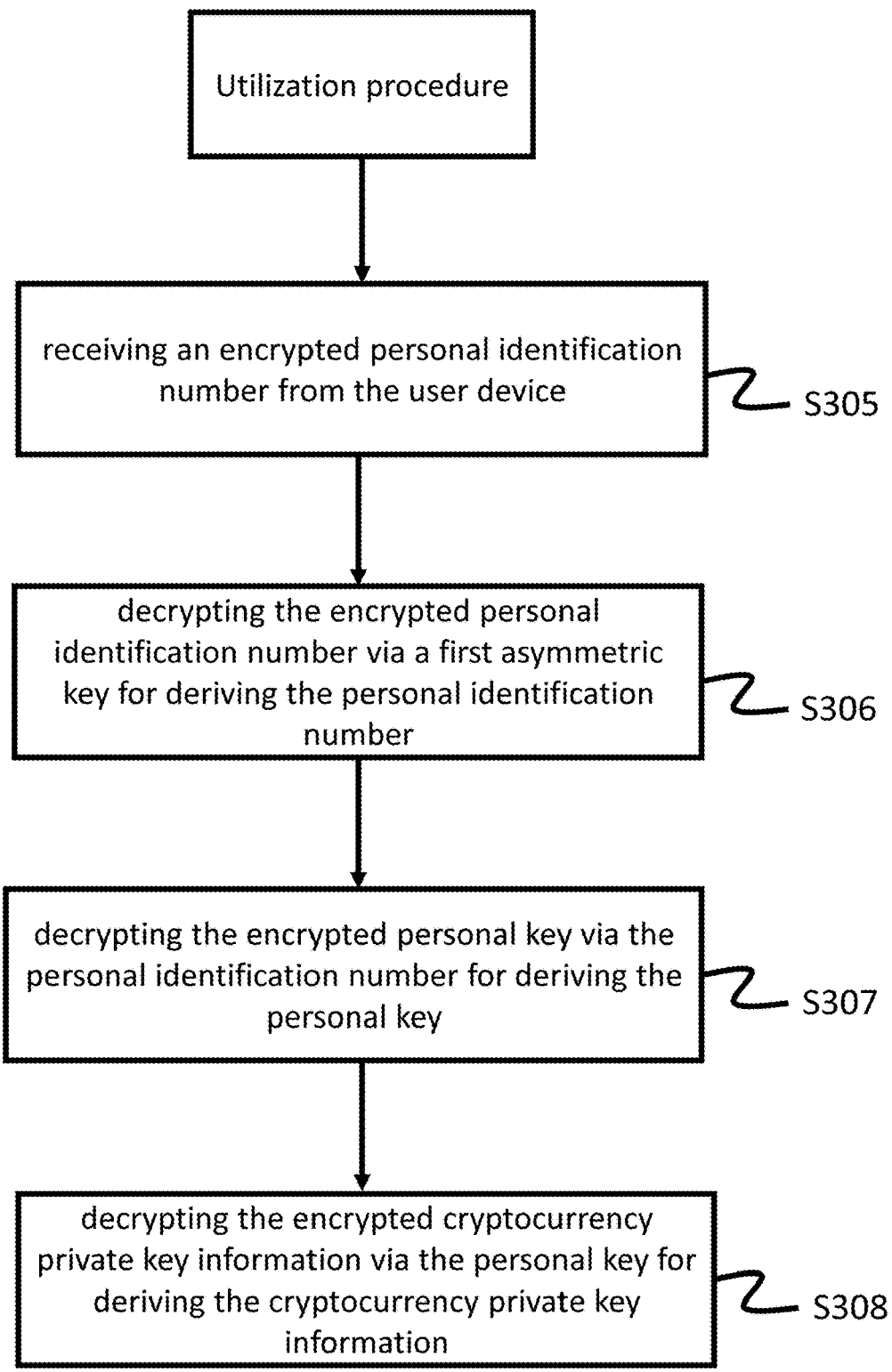
Figure 4A:
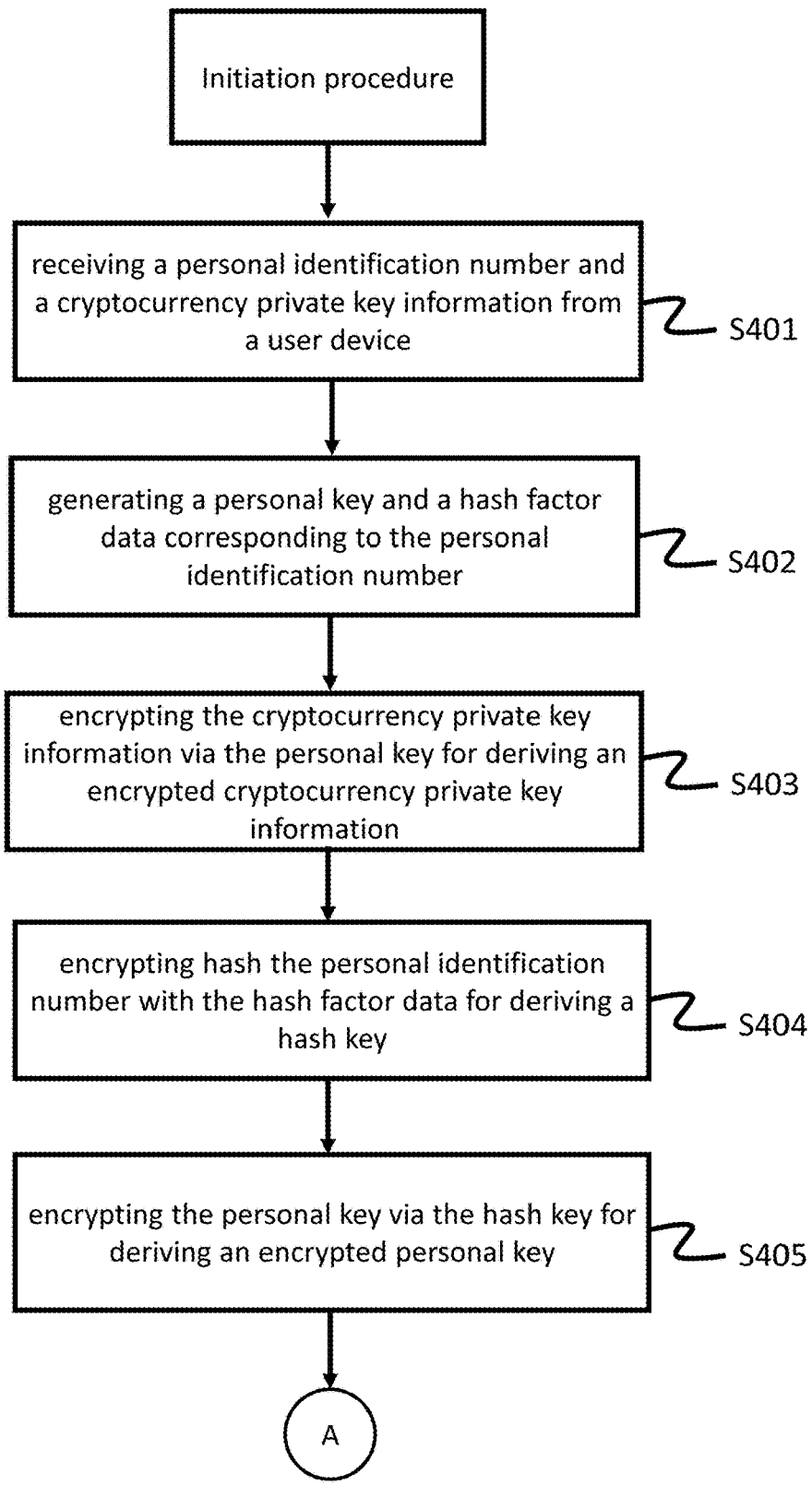
FIGS. 4A to 4F are flowchart diagrams, in accordance with some embodiments of the present disclosure.
Figure 4B:
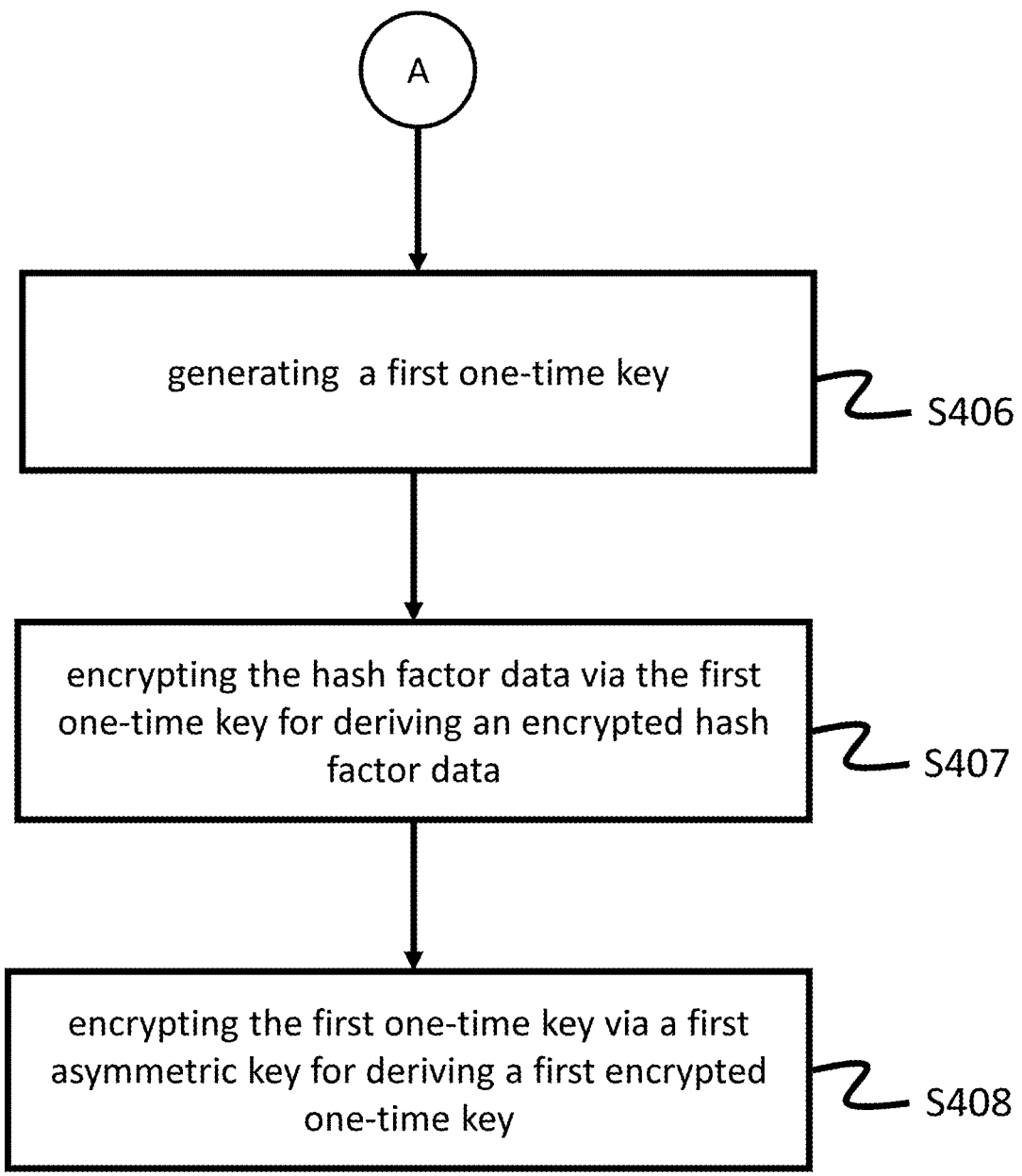
Figure 4C:
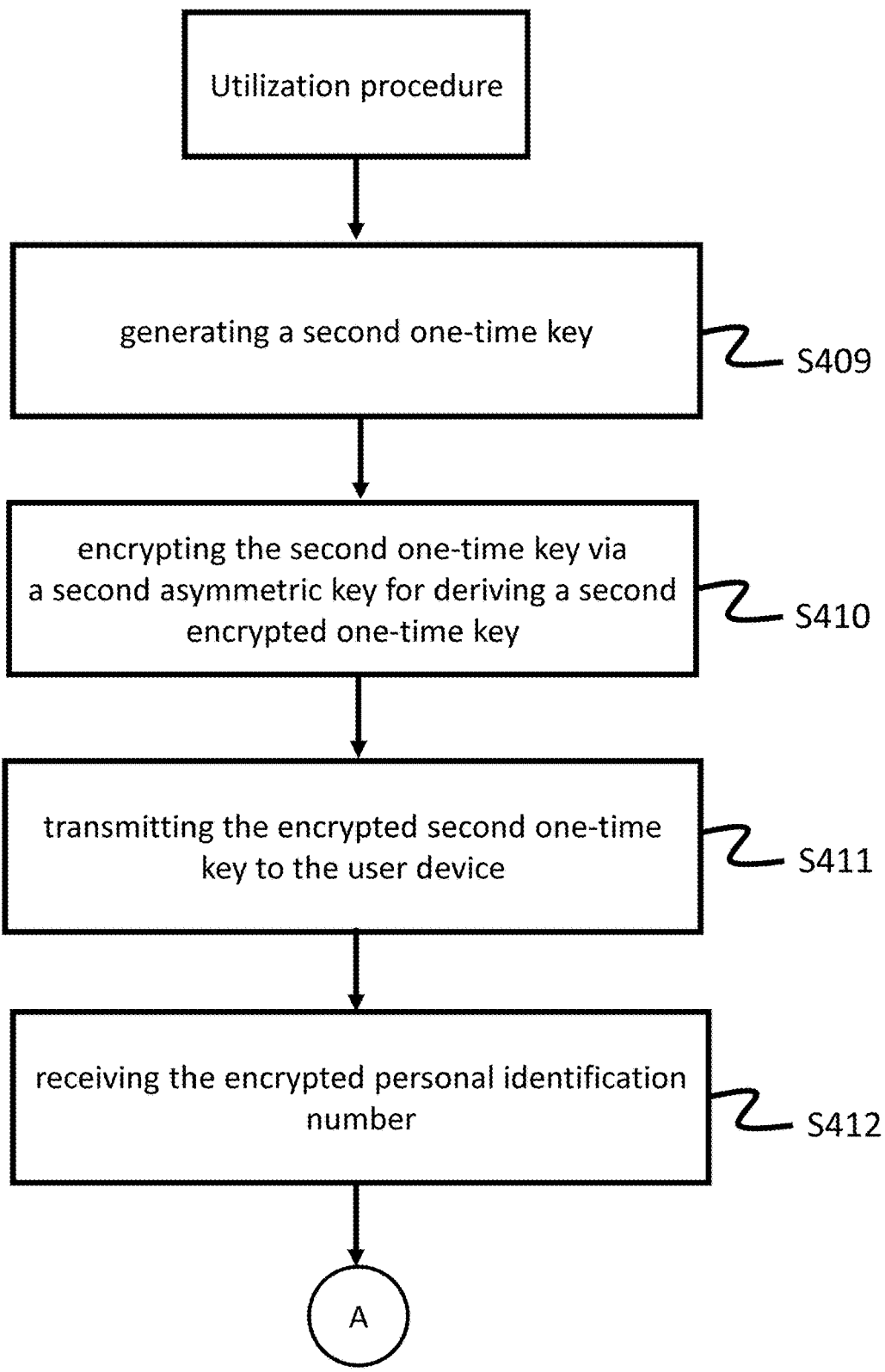
Figure 4D:
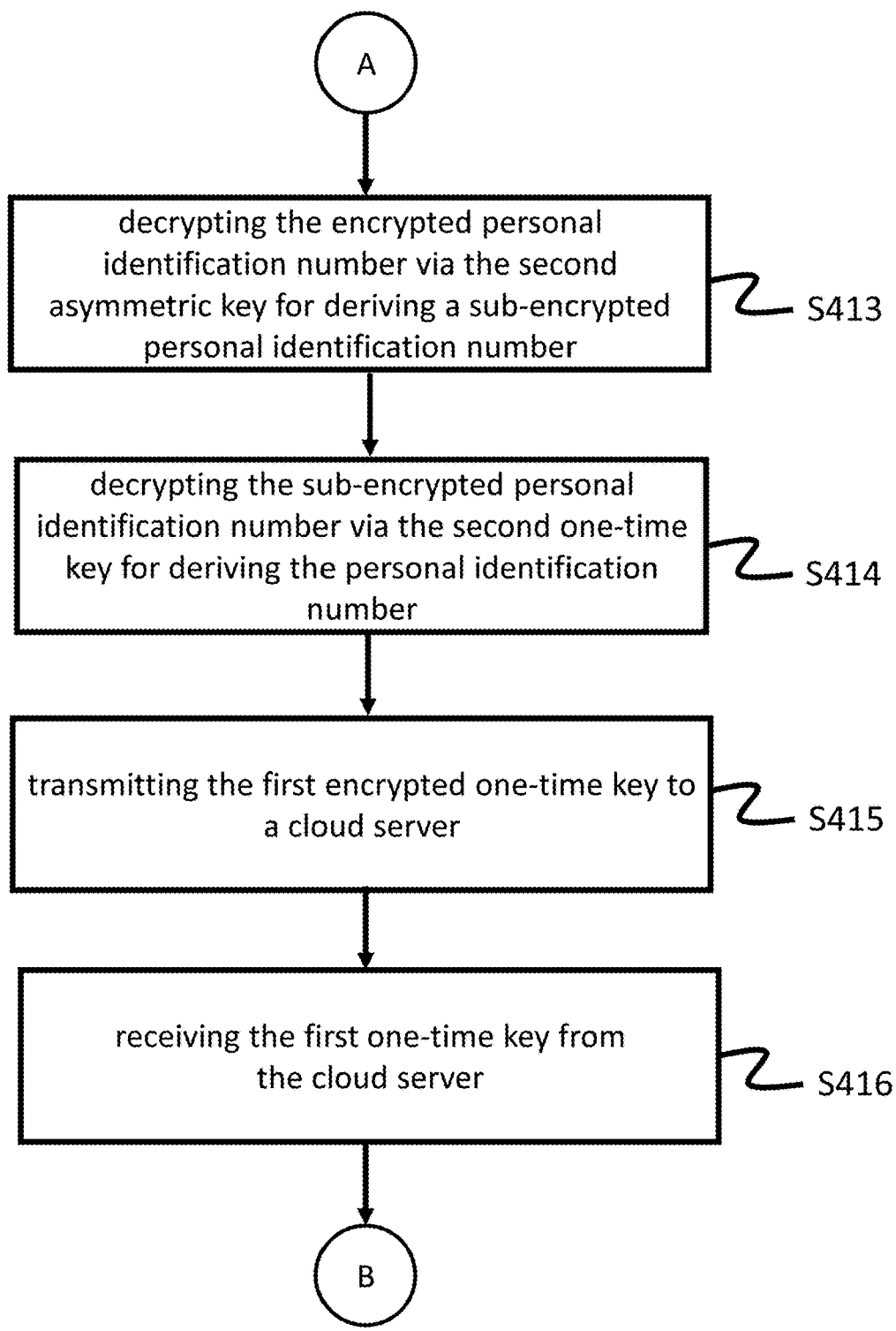
Figure 4E:
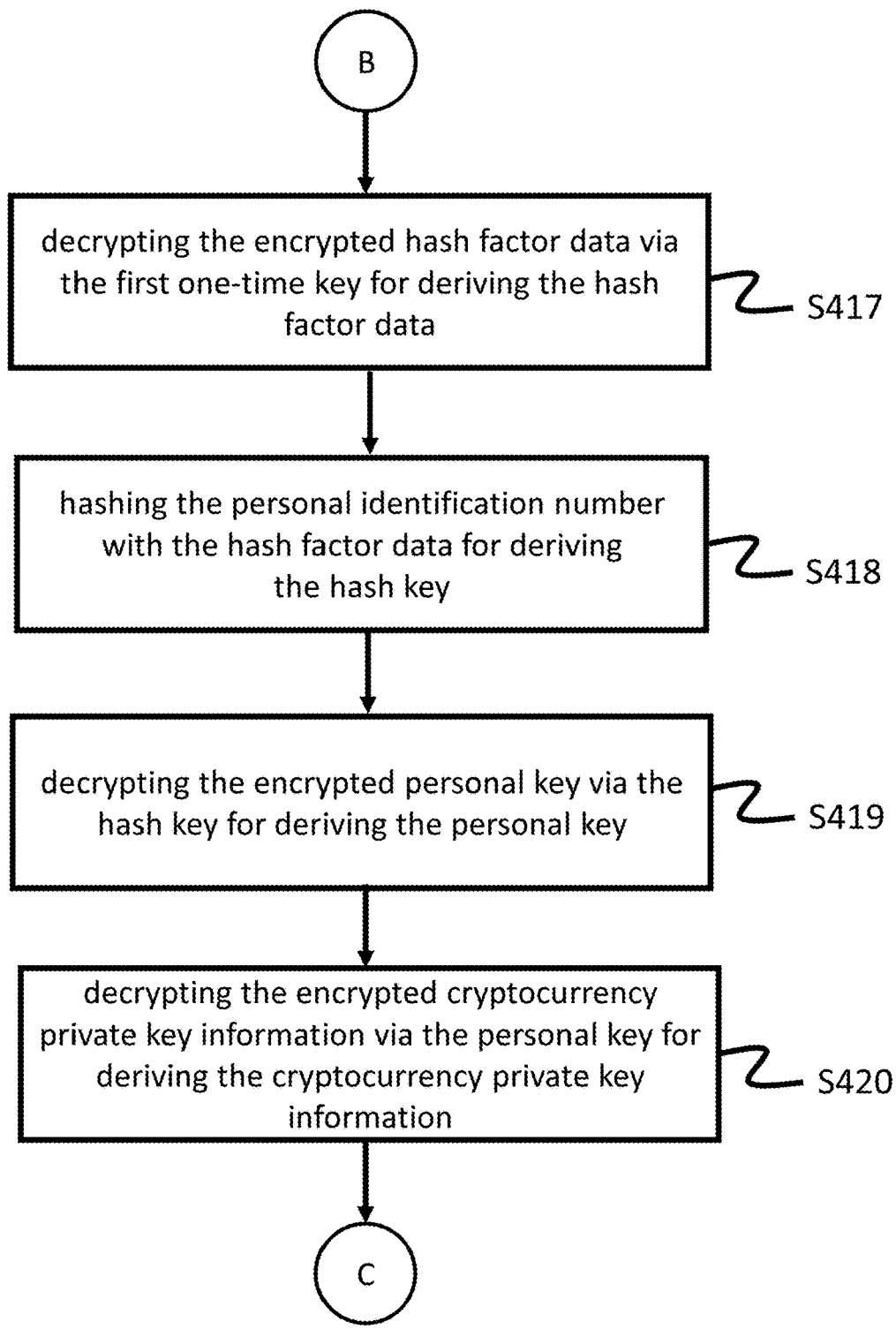
Figure 4F:
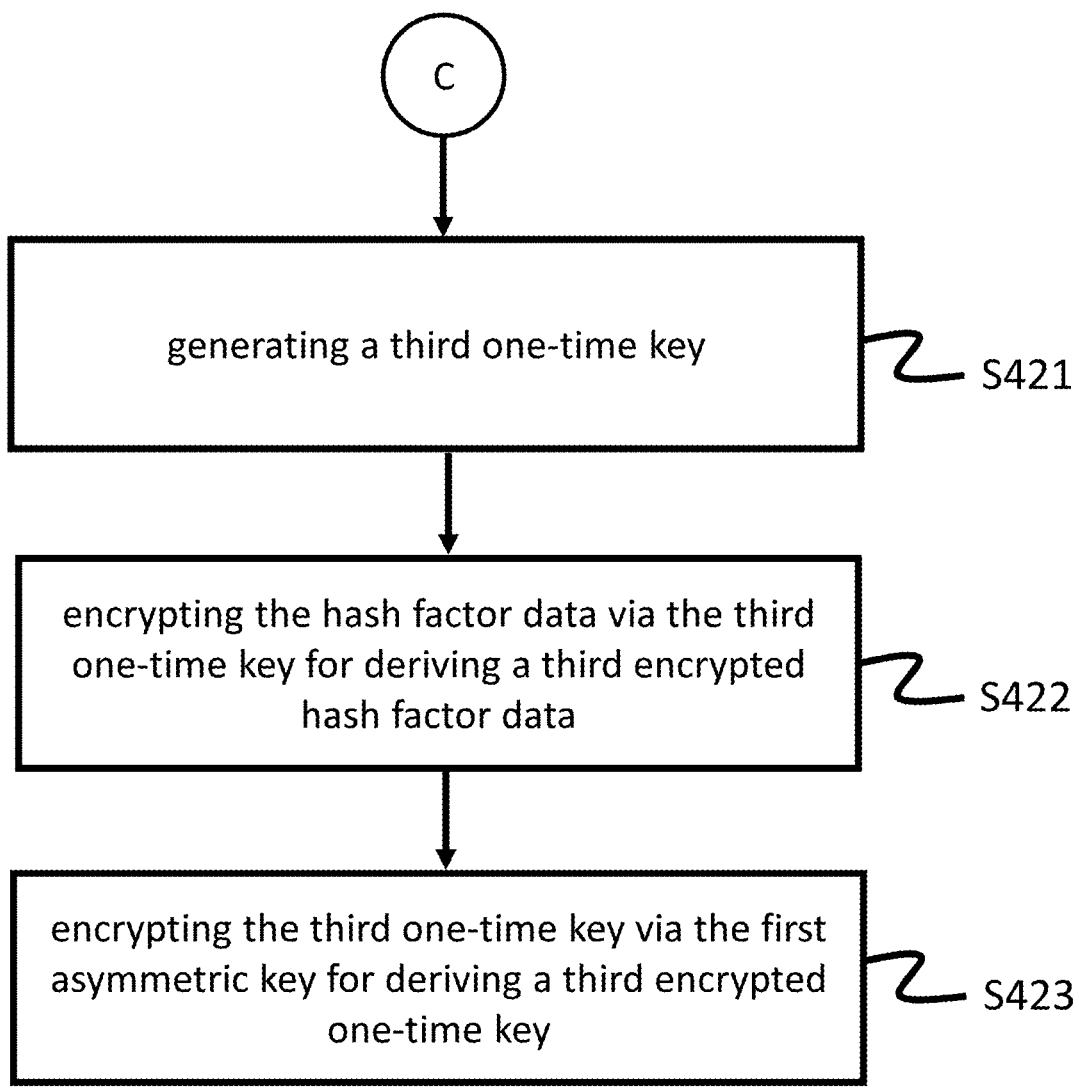

Some embodiments of the present disclosure include a cryptocurrency securing method, and flowchart diagrams thereof are as shown in FIGS. 3A and 3B. The method of some embodiments is for use in a cryptocurrency securing device (e.g., the cryptocurrency securing device of the aforesaid embodiments). Detailed operations of the cryptocurrency securing method are as follows.

For initiation procedure, operation S301 is executed to receive, by the cryptocurrency securing device, a personal identification number and a cryptocurrency private key information from a user device. Operation S302 is executed to generate, by the cryptocurrency securing device, a personal key corresponding to the personal identification number.

Next, operation S303 is executed to encrypt, by the cryptocurrency securing device, the cryptocurrency private key information via the personal key for deriving an encrypted cryptocurrency private key information. Operation S304 is then executed to encrypt, by the cryptocurrency securing device, the personal key via the personal identification number for deriving an encrypted personal key. After the encryptions, the initiation procedure is finished.

For utilization procedure, operation S305 is executed to receive, by the cryptocurrency securing device, an encrypted personal identification number from the user device. Operation S306 is executed to decrypt, by the cryptocurrency securing device, the encrypted personal identification number via a first asymmetric key for deriving the personal identification number. It should be noted that, the encrypted personal identification number is encrypted via a second asymmetric key at the end of the user device, and the first asymmetric key is paired with the second asymmetric key.

Then, operation S307 is executed to decrypt, by the cryptocurrency securing device, the encrypted personal key via the personal identification number for deriving the personal key. Operation S308 is executed to decrypt, by the cryptocurrency securing device, the encrypted cryptocurrency private key information via the personal key for deriving the cryptocurrency private key information. Therefore, a transaction based on the cryptocurrency private key information can be made.

Some embodiments of the present disclosure include a cryptocurrency securing method, and flowchart diagrams thereof are as shown in FIGS. 4A to 4D. The method of some embodiments is for use in a cryptocurrency securing device (e.g., the cryptocurrency securing device of the aforesaid embodiments). Detailed operations of the cryptocurrency securing method are as follows.

For initiation procedure, operation S401 is executed to receive, by the cryptocurrency securing device, a personal identification number and a cryptocurrency private key information from a user device. Operation S402 is executed to generate, by the cryptocurrency securing device, a personal key and a hash factor data corresponding to the personal identification number.

Next, operation S403 is executed to encrypt, by the cryptocurrency securing device, the cryptocurrency private key information via the personal key for deriving an encrypted cryptocurrency private key information. Operation S404 is then executed to hash, by the cryptocurrency securing device, the personal identification number with the hash factor data for deriving a hash key. Operation S405 is execute to encrypt, by the cryptocurrency securing device, the personal key via the hash key for deriving an encrypted personal key.

In some embodiments, operation S406 is executed to generate, by the cryptocurrency securing device, a first one-time key. Operation S407 is executed to encrypt, by the cryptocurrency securing device, the hash factor data via the first one-time key for deriving an encrypted hash factor data. Operation S408 is executed to encrypt, by the cryptocurrency securing device, the first one-time key via a first asymmetric key for deriving a first encrypted one-time key. After the encryptions, the initiation procedure is finished.

For utilization procedure, operation S409 is executed to generate, by the cryptocurrency securing device, a second one-time key. Operation S410 is executed to encrypt, by the cryptocurrency securing device, the second one-time key via a second asymmetric key for deriving a second encrypted one-time key. Operation S411 is executed to transmit, by the cryptocurrency securing device, the encrypted second one-time key to the user device.

Accordingly, the user device is capable of decrypting the second encrypted one-time key via a third asymmetric key paired with the second asymmetric key for deriving the second one-time key, and encrypting the personal identification number via the second one-time key and the third asymmetric key for deriving an encrypted personal identification number.

Next, operation S412 is executed to receive, by the cryptocurrency securing device, the encrypted personal identification number. Operation S413 is executed to decrypt, by the cryptocurrency securing device, the encrypted personal identification number via the second asymmetric key paired with the third asymmetric for deriving a sub-encrypted personal identification number. Operation S414 is executed to decrypt, by the cryptocurrency securing device, the sub-encrypted personal identification number via the second one-time key for deriving the personal identification number.

Further, operation S415 is executed to transmit, by the cryptocurrency securing device, the first encrypted one-time key to a cloud server. Hence, the cloud server is capable of decrypting the first encrypted one-time key via a fourth asymmetric key paired with the first asymmetric key for deriving the first one-time key, and transmits the first one-time key back to the cryptocurrency securing device. Operation S416 is executed to receive, by the cryptocurrency securing device, the first one-time key from the cloud server. Operation S417 is executed to decrypt, by the cryptocurrency securing device, the encrypted hash factor data via the first one-time key for deriving the hash factor data.

Afterwards, operation S418 is executed to hash, by the cryptocurrency securing device, the personal identification number with the hash factor data for deriving the hash key. Operation S419 is executed to decrypt, by the cryptocurrency securing device, the encrypted personal key via the hash key for deriving the personal key. Operation S420 is executed to decrypt, by the cryptocurrency securing device, the encrypted cryptocurrency private key information via the personal key for deriving the cryptocurrency private key information. Therefore, the cryptocurrency private key information can be used for transaction.

In addition, operation S421 is executed to generate, by the cryptocurrency securing device, a third one-time key. Operation S422 is executed to encrypt, by the cryptocurrency securing device, the hash factor data via the third one-time key for deriving a third encrypted hash factor data. Operation S423 is executed to encrypt, by the cryptocurrency securing device, the third one-time key via the first asymmetric key for deriving a third encrypted one-time key. Therefore, the third encrypted one-time key is kept safely at the end of the cryptocurrency securing device since the third encrypted one-time key can only be decrypted by the cloud server who has the fourth asymmetric key.

It should be appreciated that in FIGS. 3A~3B and 4A~4F, the orders of the operations S301~S308 and S401~S423 are not intended to limit the present disclosure. For example, S421~S423 can be executed concurrently with other operations after the hash factor data is utilized. Accordingly, the orders may be adjusted without departing from the spirit of the preset disclosure.

According to the above descriptions, the cryptocurrency securing method and device of the present disclosure mainly secure the cryptocurrency private key information via a more robust architecture of encryption/decryption, and the distributed storages under Intranet for storing different encrypted information make the cyberattack more difficult. Further, the introduction of the cloud server could be used for damage control if the device was compromised.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A cryptocurrency securing method for use in a cryptocurrency securing device, the method comprising:
    receiving, by the cryptocurrency securing device, an encrypted personal identification number from a user device;
    decrypting, by the cryptocurrency securing device, the encrypted personal identification number via a first asymmetric key for deriving a personal identification number, wherein the encrypted personal identification number is encrypted by a second asymmetric key of the user device and the first asymmetric key is paired with the second asymmetric key;
    transmitting, by the cryptocurrency securing device, a first encrypted one-time key to a cloud server so that the cloud server decrypts the first encrypted one-time key via a third asymmetric key for deriving a first one-time key, wherein the first encrypted one-time key is encrypted by a fourth asymmetric key of the cryptocurrency securing device and the third asymmetric key is paired with the fourth asymmetric key;
    receiving, by the cryptocurrency securing device, the first one-time key from the cloud server;
    decrypting, by the cryptocurrency securing device, a first encrypted hash factor data via the first one-time key for deriving a hash factor data;
    decrypting, by the cryptocurrency securing device, an encrypted personal key via the personal identification number and the hash factor data for deriving a personal key;
    decrypting, by the cryptocurrency securing device, an encrypted cryptocurrency private key information via the personal key for deriving a cryptocurrency private key information, wherein the cryptocurrency private key information includes a cryptocurrency private key or a mnemonic word data of the cryptocurrency private key, and the cryptocurrency private key corresponds to at least one cryptocurrency on blockchain; and
    using the cryptocurrency private key for a transaction of the at least one cryptocurrency on blockchain.

2. The method of claim 1, further comprising:
    generating, by the cryptocurrency securing device, a second one-time key;
    encrypting, by the cryptocurrency securing device, the second one-time key via the first asymmetric key for deriving a second encrypted one-time key; and
    transmitting, by the cryptocurrency securing device, the second encrypted one-time key to the user device so that the user device is capable of decrypting the second encrypted one-time key via the second asymmetric key for deriving the second one-time key, and encrypting the personal identification number via the second one-time key and the second asymmetric key for deriving the encrypted personal identification number.

3. The method of claim 2, wherein decrypting the encrypted personal identification number further comprises:
    decrypting, by the cryptocurrency securing device, the encrypted personal identification number via the first asymmetric key for deriving a sub-encrypted personal identification number; and
    decrypting, by the cryptocurrency securing device, the sub-encrypted personal identification number via the second one-time key for deriving the personal identification number.

4. The method of claim 1, wherein decrypting the encrypted personal key further comprises:
    hashing, by the cryptocurrency securing device, the personal identification number and the hash factor data for deriving a hash key; and
    decrypting, by the cryptocurrency securing device, the encrypted personal key via the hash key for deriving the personal key.

5. The method of claim 1, further comprising:
    generating, by the cryptocurrency securing device, a third one-time key;
    encrypting, by the cryptocurrency securing device, the hash factor data via the third one-time key for deriving a second encrypted hash factor data; and
    encrypting, by the cryptocurrency securing device, the third one-time key via the third asymmetric key for deriving a third encrypted one-time key.

6. The method of claim 1, wherein the cryptocurrency securing device forms receiving or transmitting, respectively, of at least one of the following via a computer network: the encrypted personal identification number, the first encrypted one-time key, or the first one-time key.

7. The method of claim 6, wherein the computer network comprises at least one of Internet or an intranet.

8. A cryptocurrency securing device, comprising:
    a storage module, being configured to store a first asymmetric key which is paired with a second asymmetric key of a user device, an encrypted personal key, a first encrypted one-time key, a first encrypted hash factor data and an encrypted cryptocurrency private key information;
    a transceiver, being configured to:
        receive an encrypted personal identification number from the user device, wherein the encrypted personal identification number is encrypted by the second asymmetric key;
        transmit the first encrypted one-time key to a cloud server so that the cloud server decrypts the first encrypted one-time key via a third asymmetric key for deriving a first one-time key, wherein the first encrypted one-time key is encrypted by a fourth asymmetric key stored in the storage module of the cryptocurrency securing device and the third asymmetric key is paired with the fourth asymmetric key; and
        receive the first one-time key from the cloud server;
    a processor, being connected to the transceiver and the storage module electrically, and configured to:
        decrypt the encrypted personal identification number via the first asymmetric key for deriving a personal identification number;

decrypt the first encrypted hash factor data via the first one-time key for deriving a hash factor data;

decrypt the encrypted personal key via the personal identification number and the hash factor data for deriving a personal key;

decrypt the encrypted cryptocurrency private key information via the personal key for deriving a cryptocurrency private key information, wherein the cryptocurrency private key information includes a cryptocurrency private key or a mnemonic word data of the cryptocurrency private key, and the cryptocurrency private key corresponds to at least one cryptocurrency on blockchain; and use the cryptocurrency private key for a transaction of the at least one cryptocurrency on blockchain.

9. The device of claim 8, wherein the processor is further configured to:

generate a second one-time key; and encrypt the second one-time key via the first asymmetric key for deriving a second encrypted one-time key;

wherein the transceiver is further configured to:

transmit the second encrypted one-time key to the user device so that the user device is capable of decrypting the second encrypted one-time key via the second asymmetric key for deriving the second one-time key, and encrypting the personal identification number via the second one-time key and the second asymmetric key for deriving the encrypted personal identification number.

10. The device of claim 9, wherein the processor is further configured to:

decrypt the encrypted personal identification number via the first asymmetric key for deriving a sub-encrypted personal identification number; and decrypt the sub-encrypted personal identification number via the second one-time key for deriving the personal identification number.

11. The device of claim 8, wherein the processor is further configured to:

hash the personal identification number and the hash factor data for deriving a hash key; and decrypt the encrypted personal key via the hash key for deriving the personal key.

12. The device of claim 8, wherein the processor is further configured to:

generate a third one-time key;

encrypt the hash factor data via the third one-time key for deriving a second encrypted hash factor data; and encrypt the third one-time key via the fourth asymmetric key for deriving a third encrypted one-time key;

wherein the storage module is further configured to store the second encrypted hash factor data and the third encrypted one-time key.

13. The device of claim 12, wherein the storage module further comprises:

at least one storage, being configured to store the encrypted personal key, the first encrypt hash factor data, the second encrypt hash factor data, the third encrypted one-time key and the encrypted cryptocurrency private key information.

* * * * *